United States Patent
Campbell, Jr.

(10) Patent No.: US 7,940,948 B2
(45) Date of Patent: May 10, 2011

(54) METHODS AND APPARATUS FOR MOUNTING A LOUDSPEAKER

(75) Inventor: James O. Campbell, Jr., Sterling Heights, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 1183 days.

(21) Appl. No.: 11/609,607

(22) Filed: Dec. 12, 2006

(65) Prior Publication Data

US 2008/0137899 A1    Jun. 12, 2008

(51) Int. Cl.
- *H04R 1/02* (2006.01)
- *H04R 25/00* (2006.01)
- *H04R 7/00* (2006.01)
- *H04B 1/00* (2006.01)

(52) U.S. Cl. ........ 381/386; 381/389; 381/391; 381/395; 381/322; 381/86; 181/171

(58) Field of Classification Search ........... 381/386–389
See application file for complete search history.

(56) References Cited

U.S. PATENT DOCUMENTS

| | | | |
|---|---|---|---|
| 4,602,382 A * | 7/1986 | Gabbay et al. | ................ 381/391 |
| 4,852,178 A | 7/1989 | Inkman et al. | |
| 4,997,059 A | 3/1991 | See | |
| 5,273,243 A | 12/1993 | Adballah et al. | |
| 5,532,437 A | 7/1996 | Simplicean et al. | |
| 2004/0037445 A1 | 2/2004 | Kirihara et al. | |
| 2004/0247150 A1 | 12/2004 | Iwaya et al. | |

FOREIGN PATENT DOCUMENTS

| | | | |
|---|---|---|---|
| JP | 200116937 | * | 6/2001 |
| JP | 2001169374 | | 6/2001 |

* cited by examiner

*Primary Examiner* — Curtis Kuntz
*Assistant Examiner* — Sunita Joshi
(74) *Attorney, Agent, or Firm* — Matthew B. Dernier, Esq.; Gibson & Dernier LLP

(57) ABSTRACT

Methods and apparatus provide for: a speaker frame having a peripheral flange defining a central axis and a plurality of studs extending from the peripheral flange parallel to the axis; and a carrier plate having an aperture through which at least one of: a portion of a speaker may extend or through which the speaker may direct acoustic energy, a plurality of receiving elements disposed about the aperture, each receiving element having at least one ramped surface extending generally tangentially with respect to a perimeter of the aperture and rising in a direction parallel to the central axis, wherein the studs engage and slide along the ramped surfaces when the speaker frame is coupled to the carrier plate and rotated to lock the speaker frame to the carrier plate.

10 Claims, 4 Drawing Sheets

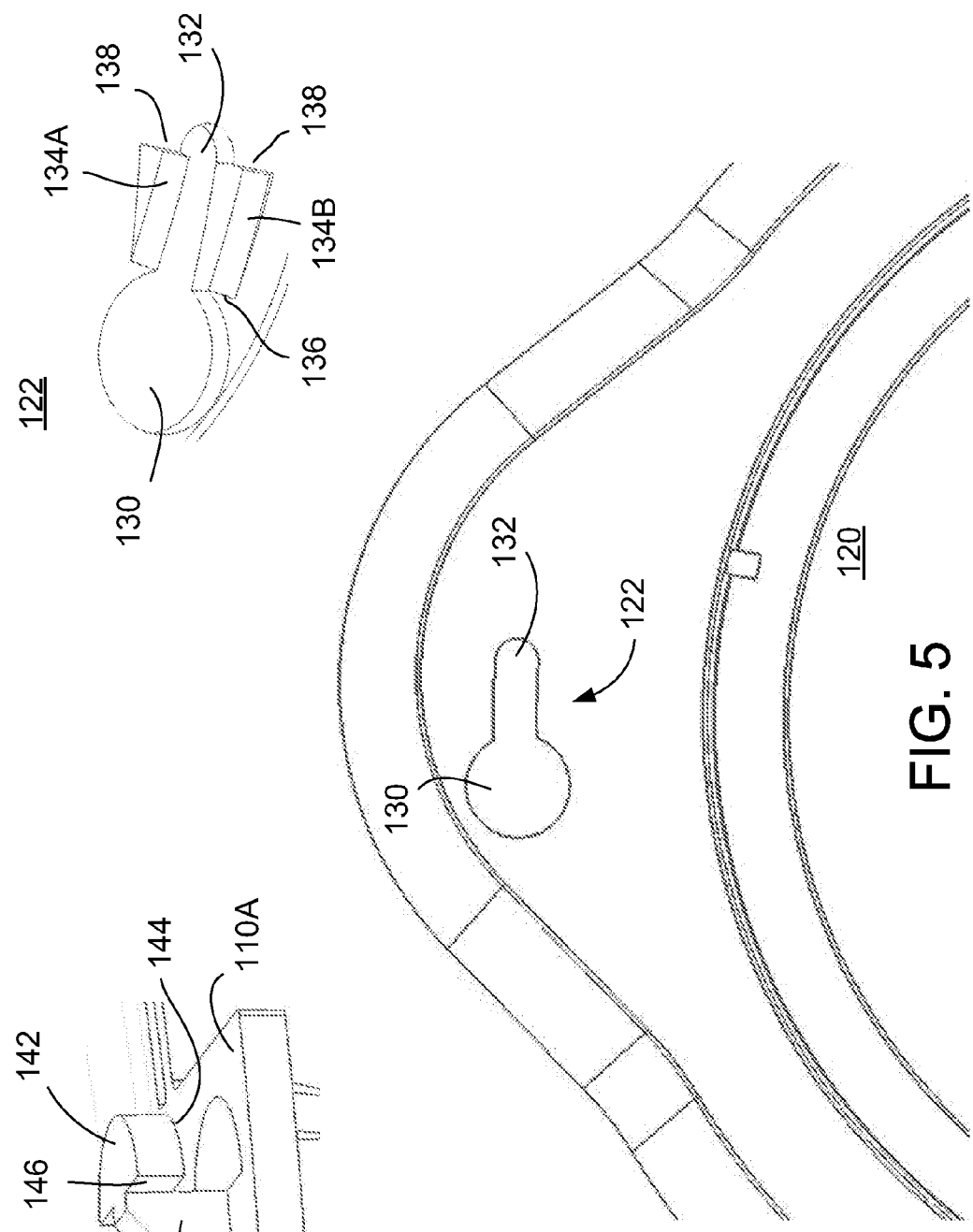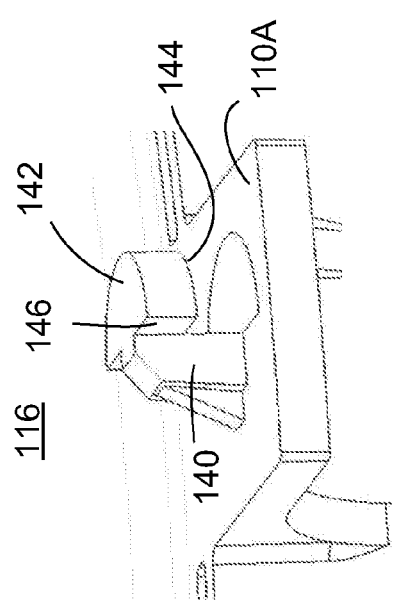

METHODS AND APPARATUS FOR MOUNTING A LOUDSPEAKER

BACKGROUND

The present invention relates to methods and apparatus for mounting loudspeakers to carriers, such as may be found in automobile interiors, speaker cabinets, buildings, etc.

With reference to FIGS. 1-2, it is often desirable to mount a loudspeaker 10 in, for example, an automobile interior, such as the door 20 of the vehicle. In diaphragm-type loudspeaker manufacture and assembly, a common technique for mounting the loudspeaker 10 to the door (or other structure) is to employ a carrier 30 to receive and provide structural support to a frame of the loudspeaker 10. The loudspeaker 10 may include a plurality of holes 12 around the perimeter of the frame or "basket" and corresponding holes 32 in the carrier 30. Fasteners 14, usually threaded fasteners such as screws or bolts, are inserted through the aligned holes 12 in the speaker frame perimeter and the holes 32 in the carrier to fix the loudspeaker 10 to the carrier 30. Typically, an elastomeric gasket 22 having the same configuration as the perimeter of the frame is positioned between the loudspeaker perimeter and the carrier 30 to seal the two together and to minimize the likelihood of relative movement and other phenomena which might otherwise result in the generation of noise between the frame and carrier.

This common technique requires the stocking of the fasteners 14, the provision of aligned holes in the frame of the loudspeaker 10, the carrier 30 and the elastomeric gasket 22, and the labor involved in assembly of these components with the holes 12, 32 aligned using the fasteners 14. Frequently, this assembly is complicated by the configuration of the space in which the loudspeaker 10 is to be mounted. For example, when the mounting is into the carrier 30 of a vehicle door panel (and door module), the use of fasteners 14 increases the complexity, assembly time and cost, inventory costs, and potential for mechanical failure or tolerance problems.

Other techniques for mounting loudspeakers to carriers are disclosed, for example, in U.S. Patent Publication No. 2004/0247150. U.S. 2004/0247150 discloses in FIGS. 2 and 6 a speaker (1) for a vehicle and an installation structure for enhancing the speaker installation rigidity without impairing the acoustic characteristic of the speaker. The speaker installation structure includes the speaker unit (1) for holding a speaker body (11) and having a plurality of claws (13) and a panel member (3) having an opening (4) and a plurality of slits (5). The claws (13) are inserted into the plurality of slits (5) and the speaker unit (1) is rotated in its circumferential direction. It is believed that the interconnection between the claws (13) and the door inner panel (3), however, is susceptible to disengagement due to vibration.

Accordingly, there are needs in the art for new methods and apparatus for mounting loudspeakers to carriers, which address some or all of these concerns.

SUMMARY OF THE INVENTION

In accordance with one or more embodiments of the invention, a loudspeaker (or "speaker") is made with studs extending from the speaker face (where the typical holes 12 would be). The carrier (or integral door panel/frame) includes a number of ramped structures (or receiving elements) on the interior ("B-side") of the carrier to receive the same number of studs of the speaker. The speaker is rotated so the studs engage and slid up the ramps, and with further turning the studs lock in position without the need for bolts. The ramped structures may include a slight negative (lower) surface that captures the stud and prevents loosening of the speaker during vibration. An eccentric alignment pattern as between the studs and the ramped structures may be employed to ensure that the speaker is only able to be mounted in one configuration.

In accordance with one or more embodiments of the invention, an apparatus includes: a speaker frame having a peripheral flange defining a central axis and a plurality of studs extending from the peripheral flange parallel to the axis; and a carrier plate having an aperture through which at least one of: a portion of a speaker may extend or through which the speaker may direct acoustic energy, a plurality of receiving elements disposed about the aperture, each receiving element having at least one ramped surface extending generally tangentially with respect to a perimeter of the aperture and rising in a direction parallel to the central axis. The studs engage and slide along the ramped surfaces when the speaker frame is coupled to the carrier plate and rotated to lock the speaker frame to the carrier plate.

Each of the studs preferably includes a shaft extending substantially parallel to the central axis, and a head disposed at a distal end of the shaft. The head includes a first surface directed opposite to the extension of the shaft and is operable to engage and slide along the ramped surface of an associated one of the ramped surfaces to lock the speaker frame to the carrier plate. Each of the receiving elements includes a primary aperture and a slot extending through the carrier plate, where the slot communicates with the primary aperture and extends generally parallel to the ramped surfaces. The head of the stud is operable to pass through the primary aperture of the receiving element, from a side of the carrier plate opposite to the ramped surfaces, and the shaft is operable to slide down the slot.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 4 is perspective view of a stud suitable for use in the apparatus of FIG. 3 to affix a speaker frame to a carrier plate;

FIGS. 5-6 are opposite views of a receiver element suitable for use in the apparatus of FIG. 3 to affix the speaker frame to the carrier plate;

DETAILED DESCRIPTION OF THE PRESENT INVENTION

Figure 1:
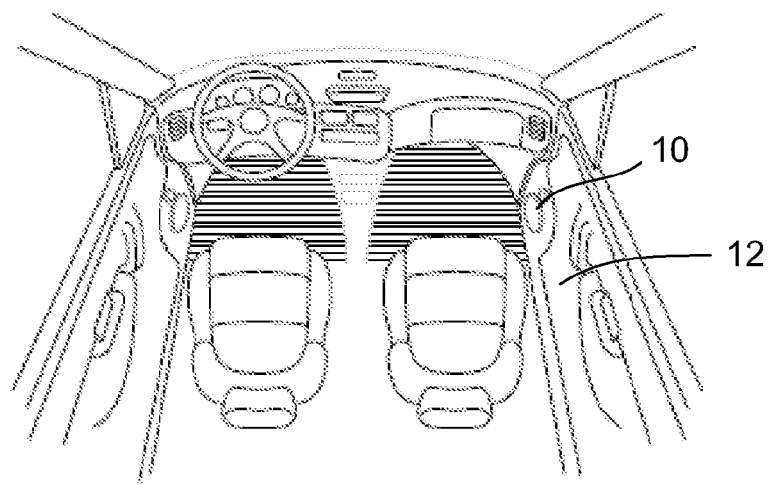
FIG. 1 is a perspective view of an interior of a vehicle in which a speaker may be mounted in accordance with the prior art.
Figure 2:
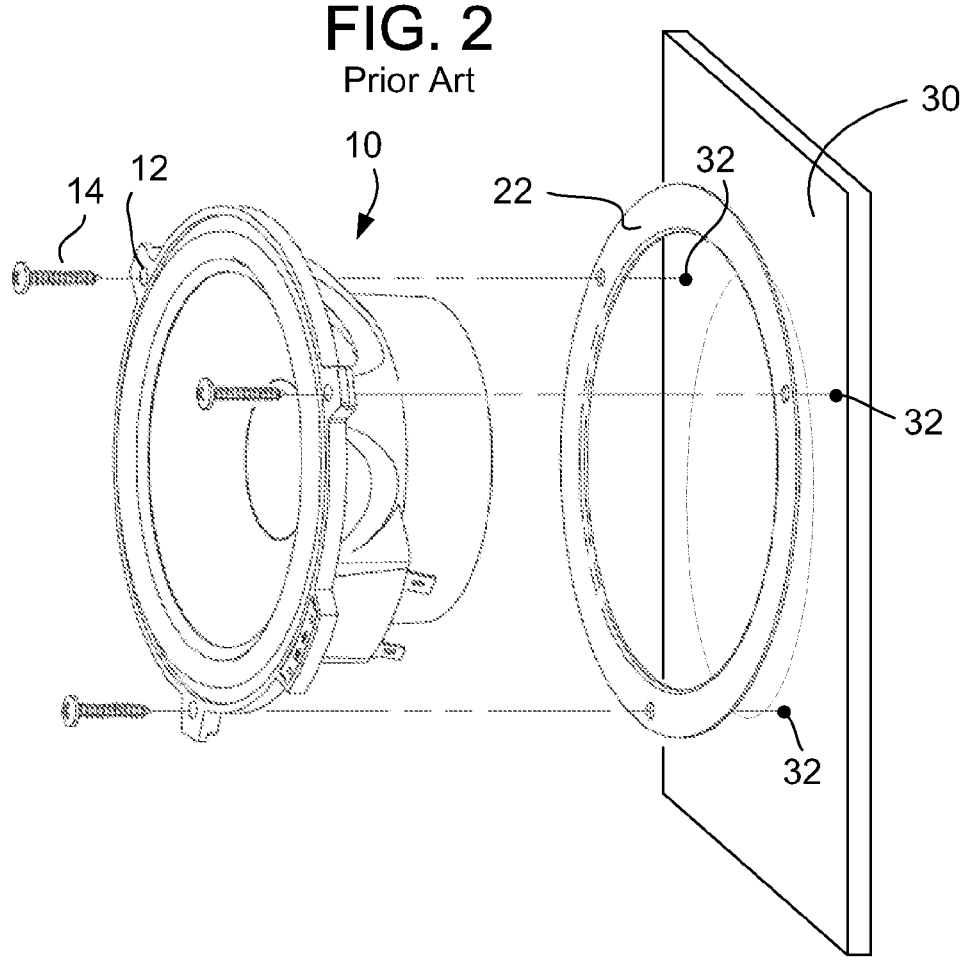
FIG. 2 is a perspective, exploded diagram illustrating a speaker mounting technique in accordance with the prior art.
Figure 3:
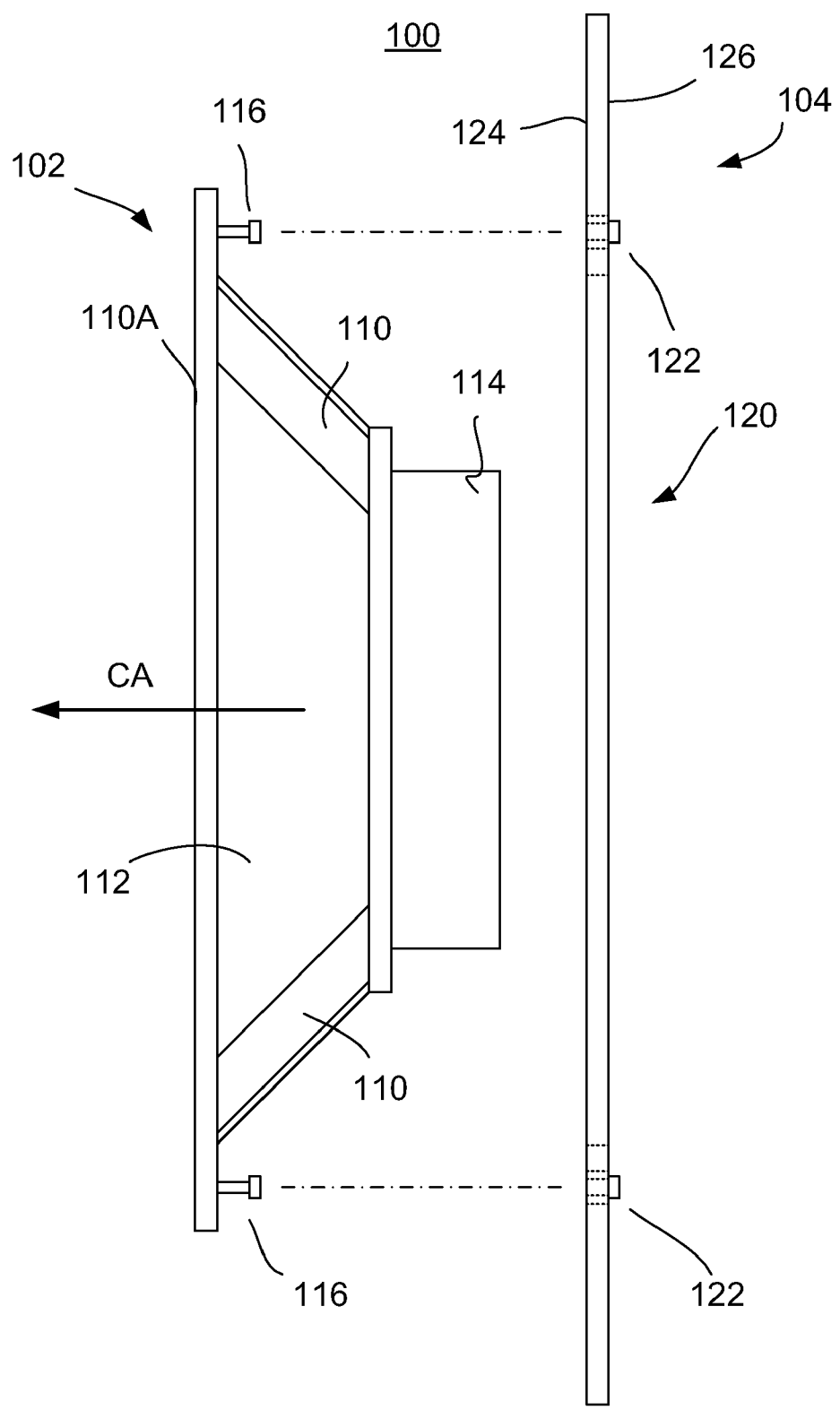
FIG. 3 is a side view illustrating a speaker mounting technique in accordance with one or more embodiments of the present invention.

With reference to the drawings, wherein like numerals indicate like elements, there is shown in FIG. 3 a loudspeaker mounting system 100 in accordance with one or more aspects of the present invention. The system 100 includes a loudspeaker 102 and a carrier plate 104. The carrier plate 104 may be a separate component or may be integral with a larger object, such as a door panel of a vehicle, a speaker cabinet, and/or any other structure in which the speaker 102 is to be mounted. The speaker 102 includes a frame 110 (or basket) having a peripheral flange 110A defining a central axis (CA). As in conventional loudspeaker technology, a diaphragm 112 moves forward and backward along the central axis CA in response to a voice coil/magnet structure 114 to create acoustic energy propagating in the CA direction. A plurality of studs 116 extend from the peripheral flange 110A. As illustrated in this embodiment of the invention, the studs 116 extend from a rear surface of the peripheral flange 110A. As will be discussed later herein, in alternative embodiments the studs 116 may extend from a front surface of the peripheral flange 110A.

The carrier plate 104 includes an aperture 120 extending therethrough from a first surface 124 to a second surface 126. The voice coil/magnet 114 and at least a portion of the frame/basket 110 may extend through the aperture 120 when the speaker 102 is mounted to the carrier plate 104. The carrier plate 104 also includes a plurality of receiving elements 122 disposed about the aperture 120. When the speaker 102 is mounted to the carrier plate 104, the studs 116 engage the receiving elements 122 of the carrier plate 104 in order to fix the speaker 102 to the carrier plate 104.

Reference is now made to FIGS. 4, 5, and 6, which illustrate further details of the studs 116 and the receiving elements 122. FIG. 5 illustrates a receiving element 122 as viewed from the first surface 124 of the carrier plate 104, while FIG. 6 illustrates the receiving element 122 viewed from the second surface 126 of the carrier plate 104. The receiving elements 122 preferably include a primary aperture 130 and a slot 132 extending through the carrier plate 104, where the slot 132 communicates with the primary aperture 130. The slot 132 preferably extends substantially tangentially with respect to the aperture 120. As best seen in FIG. 6, the receiving elements 122 include at least one ramped surface 134 extending along the slot 132, with two (2) ramped surfaces 134A, 134B on either side of the slot 132 being preferred. Irrespective of the number of ramped surfaces employed, each ramped surface 134 preferably initiates at an end 136 adjacent to the primary aperture 130 and then extends along the slot 132 in a ramped orientation (rising away from the surface 126 of the carrier plate 104) to terminate at a distal end 138. Thus, each of the ramp surfaces 134 may form a step at the distal end 138 at or near an end of the slot 132.

As Best seen in FIG. 4, one or more on the studs 116 preferably include a shaft 140 extending from the peripheral flange 110A in a direction substantially parallel to the central axis CA. The studs 116 preferably include a head 142 disposed at a distal end of the shaft 140. The head 142 preferably includes a first surface 144 directed opposite to the extension of the shaft 140. In others words, the first surface 144 generally faces a plane defined by the peripheral flange 110A. The head 142 also preferably includes a second surface 146 in a substantially transverse orientation with respect to the first surface 144. In other words, the second surface 144 extends in a plane generally parallel to the extension of the shaft 140.

Figure 7:
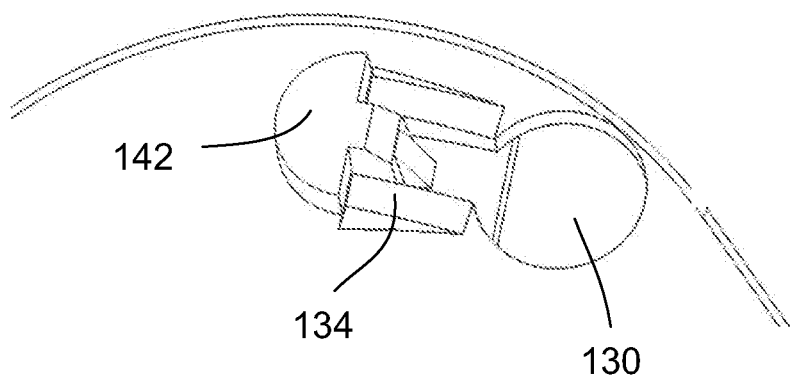
FIG. 7 is perspective view of the stud and receiver element of FIGS. 4-6 in a locked orientation.

With further reference to FIG. 7, when the speaker 102 is coupled to the carrier plate 104, the studs 116 are aligned with the primary apertures 130 of the receiving elements 122 and the speaker 102 is inserted into aperture 120 such that the studs 116 engage the receiving elements 122. In particular, the primary aperture 130 of the receiving element 122 is sized and shaped to receive the head 142 of an associated one of the studs 116. The shaft 140 has a length sufficient to orient the head 142 such at the first surface 144 is adjacent and opposing the ramped surfaces 134. Next, the speaker 102 is rotated with respect the carrier plate 104 such at the first surfaces 144 of the studs 116 engage and slide along the ramped surfaces 134 as the shafts 140 move within the slots 132. When the respective studs 116 have moved within the associated slots 132 to a sufficient degree, the second surface 146 of the head 142 of each stud 116 preferably engages with the step 138 of the associated ramped surface 134 such that the stud 116 is locked within the receiving element 122.

In one or more embodiments, an elastomeric gasket (not shown) may be interposed between the flange 110 and the carrier plate 104 such that some flexibility (compression) is achieved as the speaker 102 is rotated and the first surfaces 144 of the studs 116 engage with the ramped surfaces 134. This provides advantageous limits on the forces experienced by the studs 116 (improving reliability) as well as improving the coupling of the speaker 102 to the carrier plate 104 even under vibration. Automotive applications will have the elastomeric seal for vibration as well as sealing between wet and dry sides of door.

Advantageously, the speaker 102 maybe coupled to the carrier plate 104 without the need of separate fastening elements, such as screws, bolts, etc. Further, the configurations of the studs 116 and the receiving elements 122 are such that, once locked into position, the speaker 102 is unlikely or unable to disengage form the carrier plate 104 even in the presence of significant shock and/or vibrations.

With reference to FIG. 3, it is noted that in alternative embodiments, the studs 116 may be disposed on an opposite side of the peripheral flange 110A such that they extend in an opposite direction shown. In such embodiments, the speaker 102 may engage with the carrier plate 104 such that the central axis CA is directed to and extends through the aperture 120 of the carrier plate 104. In such a configuration, the speaker 102 would be coupled to the carrier plate 104 in substantially the same fashion discussed hereinabove; however, the orientation of the speaker 102 with respect to the carrier plate 104 would be such that the acoustic energy propagating from the speaker 102 would pass through the aperture 120 of the carrier plate 104.

Figure 8:
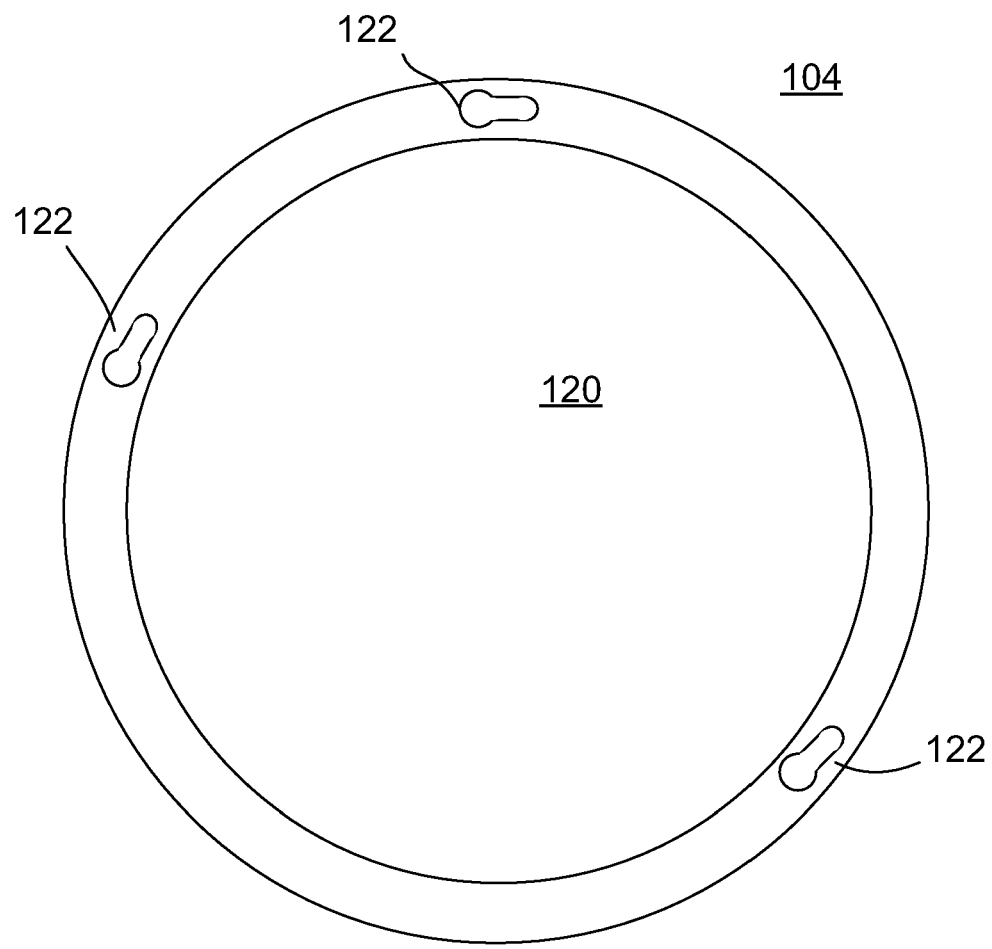
FIG. 8 is front view of an orientation of the receiving elements about a carrier plate in accordance with one or more further aspects of the present invention.

With reference to FIG. 8, the studs 116 and the receiving elements 122 may be deposed asymmetrically about the speaker 102 and the carrier plate 104, respectively, such that the speaker 102 may engage the carrier plate 104 in only one orientation. Advantageously, this permits the speaker 102 to be in a known orientation once connected to the carrier plate 104. By way of example, if the carrier plate 104 is coupled to, or integral with the door panel of a vehicle, the speaker 102 would be sure to be a particular orientation known to operators on an assembly line. Thus, the electrical connections to the speaker 102 may be made from a know direction, thereby improving the overall assembly process.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A speaker mounting system, comprising:
   a speaker frame having a peripheral flange defining a central axis and a plurality of studs extending from the peripheral flange parallel to the axis; and
   a carrier plate having an aperture through which at least one of: a portion of a speaker may extend or through which the speaker may direct acoustic energy, a plurality of receiving elements disposed about the aperture, each receiving element having at least one ramped surface extending generally tangentially with respect to a perimeter of the aperture and rising in a direction parallel to the central axis,
   wherein the studs engage and slide along the ramped surfaces when the speaker frame is coupled to the carrier plate and rotated to lock the speaker frame to the carrier plate.

2. The apparatus of claim 1, wherein at least one of the studs includes a shaft extending substantially parallel to the central axis, and a head disposed at a distal end of the shaft, the head including a first surface directed opposite to the extension of the shaft and operable to engage and slide along the ramped surface of an associated one of the ramped surfaces to lock the speaker frame to the carrier plate.

3. The apparatus of claim 2, wherein at least one of the receiving elements includes a primary aperture and a slot extending through the carrier plate, the slot communicating with the primary aperture and extending generally parallel to the ramped surfaces.

4. The apparatus of claim 3, wherein the ramped surfaces are disposed adjacent to and extend along the slot.

5. The apparatus of claim 3, wherein the head of the stud is operable to pass through the primary aperture of the receiving element, from a side of the carrier plate opposite to the ramped surfaces, and the shaft is operable to slide down the slot.

6. The apparatus of claim 5, wherein the first surface of the head is operable to engage the ramped surfaces and slide thereon as the shaft slides down the slot.

7. The apparatus of claim 4, wherein each of the ramped surfaces initiate adjacent to an associated one of the primary apertures, ramp as they extend along the associated slot, and terminate at a distal end thereof.

8. The apparatus of claim 7, wherein:
   each of the ramped surfaces includes a step at the distal end thereof; and
   the head includes a second surface substantially transverse to the first surface and operable to lock with the step of the ramped surfaces when the head has slid past the distal end thereof.

9. The apparatus of claim 1, wherein the studs and the receiving elements are disposed asymmetrically about the speaker frame and carrier plate aperture, respectively, such that the speaker may engage the carrier plate in only one orientation.

10. A method of mounting a speaker, comprising the steps of:
   extending a plurality of studs from a peripheral flange a speaker frame, the flange defining a central axis and the studs extending substantially parallel to the central axis;
   engaging the studs with a plurality of receiving elements disposed about an aperture of a carrier plate; and
   rotating the speaker frame with respect to the carrier plate such that the studs engage and slide along ramped surfaces of the receiving elements to lock the speaker frame to the carrier plate, the ramped surfaces extending generally tangentially with respect to a perimeter of the aperture and rising in a direction parallel to the central axis.

* * * * *